United States Patent
Imahori et al.

(10) Patent No.: US 8,015,724 B2
(45) Date of Patent: Sep. 13, 2011

(54) HEATING BLOWER WITH ELECTROSTATIC ATOMIZING DEVICE

(75) Inventors: Osamu Imahori, Hikone (JP); Toshihisa Hirai, Hikone (JP); Kishiko Hirai, legal representative, Hikone (JP); Akihide Sugawa, Hikone (JP); Fumio Mihara, Hikone (JP); Shousuke Akisada, Hikone (JP); Hirokazu Yoshioka, Osaka (JP); Kousuke Katayama, Hirakata (JP); Toshiyuki Yamauchi, Ibaraki (JP); Hiroshi Suda, Takatsuki (JP); Yasunori Matsui, Hikone (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 932 days.

(21) Appl. No.: 11/587,011

(22) PCT Filed: Apr. 19, 2005

(86) PCT No.: PCT/JP2005/007417
§ 371 (c)(1),
(2), (4) Date: Nov. 26, 2007

(87) PCT Pub. No.: WO2005/102101
PCT Pub. Date: Nov. 3, 2005

(65) Prior Publication Data
US 2008/0229606 A1    Sep. 25, 2008

(30) Foreign Application Priority Data
Apr. 23, 2004 (JP) ................ 2004-128816

(51) Int. Cl.
*F26B 11/00* (2006.01)
(52) U.S. Cl. ......... 34/97; 34/80; 34/90; 34/218; 34/242; 34/201; 705/14; 134/34; 239/690; 118/723 R; 95/4; 95/65

(58) Field of Classification Search ............... 34/201, 34/90, 138, 80, 218, 242, 97; 60/780; 134/34; 705/14; 95/4, 65; 118/723 R; 239/690
See application file for complete search history.

(56) References Cited

U.S. PATENT DOCUMENTS
1,334,590 A * 3/1920 Bloom .............. 204/157.46
(Continued)

FOREIGN PATENT DOCUMENTS
EP    270277 A1 *  6/1988
(Continued)

OTHER PUBLICATIONS
Supplementary European Search Report for European Application No. EP 05 73 4666.0 issued Aug. 25, 2010.

*Primary Examiner* — Stephen Gravini
(74) *Attorney, Agent, or Firm* — Edwards Angell Palmer & Dodge LLP (57) ABSTRACT

This heating blower has a housing 1, a fan 2, a heater 3, and an electrostatic atomizing device 5. The electrostatic atomizing device 5 is provided in the housing 1 and discharges nanometer-size ion mist to the outside. The electrostatic atomizing device 5 comprises a discharging electrode 50, an opposed electrode 52 disposed opposite the discharging electrode 50, a cooling part 53 which cools the discharging electrode 50 to generate moisture from ambient air near the discharging electrode, and a high voltage applying part 55 which applies a high voltage between said discharging electrode and the opposed electrode to atomize water generated near the discharging electrode. Therefore, this heating blower can discharge nanometer-size ion mist to the outside without replenishment of water.

7 Claims, 4 Drawing Sheets

U.S. PATENT DOCUMENTS

| | | | | |
|---|---|---|---|---|
| 2,248,713 A * | 7/1941 | Locke | | 422/121 |
| 2,297,691 A * | 10/1942 | Carlson | | 430/55 |
| 2,336,745 A * | 12/1943 | Manning | | 264/10 |
| 2,343,338 A * | 3/1944 | Steel | | 422/4 |
| 2,476,282 A * | 7/1949 | Castellan | | 442/365 |
| 2,491,889 A * | 12/1949 | Bennett et al. | | 65/529 |
| 2,888,362 A * | 5/1959 | Starkey | | 427/470 |
| 2,906,803 A * | 9/1959 | Brown | | 419/2 |
| 2,949,168 A * | 8/1960 | Peterson | | 96/27 |
| 3,274,937 A * | 9/1966 | Kyle | | 102/202.7 |
| 3,276,987 A * | 10/1966 | Williams | | 204/224 M |
| 3,303,737 A * | 2/1967 | Kyle | | 86/1.1 |
| 3,331,192 A * | 7/1967 | Peterson | | 96/27 |
| 3,338,992 A * | 8/1967 | Kinney | | 264/441 |
| 3,418,788 A * | 12/1968 | Senichi | | 95/66 |
| 3,507,968 A * | 4/1970 | Parsons | | 373/47 |
| 3,511,303 A * | 5/1970 | Parsons | | 164/470 |
| 3,643,623 A * | 2/1972 | Eng et al. | | 95/29 |
| 3,643,624 A * | 2/1972 | Eng et al. | | 116/137 A |
| 3,794,243 A * | 2/1974 | Tamny et al. | | 239/3 |
| 3,848,068 A * | 11/1974 | Rice | | 23/335 |
| 3,923,697 A * | 12/1975 | Ellis | | 252/506 |
| 3,947,659 A | 3/1976 | Ono | | |
| 3,960,505 A * | 6/1976 | Marks | | 422/168 |
| 3,979,205 A * | 9/1976 | Wanzenberg | | 75/10.19 |
| 3,999,040 A * | 12/1976 | Ellis | | 219/543 |
| 4,038,570 A * | 7/1977 | Durley, III | | 310/318 |
| 4,064,074 A * | 12/1977 | Ellis | | 252/506 |
| 4,085,893 A * | 4/1978 | Durley, III | | 239/102.2 |
| 4,091,779 A * | 5/1978 | Saufferer et al. | | 123/536 |
| 4,102,982 A * | 7/1978 | Weir, Jr. | | 423/243.1 |
| 4,106,697 A * | 8/1978 | Sickles et al. | | 239/690.1 |
| 4,193,009 A * | 3/1980 | Durley, III | | 310/323.19 |
| 4,224,355 A * | 9/1980 | Lampkin et al. | | 427/8 |
| 4,239,504 A * | 12/1980 | Polizzotti et al. | | 95/58 |
| 4,239,809 A * | 12/1980 | Lampkin et al. | | 427/74 |
| 4,240,585 A * | 12/1980 | Sickles | | 239/705 |
| 4,256,127 A * | 3/1981 | Tsujimoto et al. | | 132/212 |
| 4,261,720 A * | 4/1981 | Helbing | | 65/474 |
| 4,294,588 A * | 10/1981 | Polizzotti et al. | | 95/58 |
| 4,305,909 A * | 12/1981 | Willett et al. | | 422/169 |
| 4,307,681 A * | 12/1981 | Lampkin et al. | | 118/666 |
| 4,364,910 A * | 12/1982 | Willett et al. | | 423/243.01 |
| 4,369,167 A * | 1/1983 | Weir, Jr. | | 423/210 |
| 4,380,720 A * | 4/1983 | Fleck | | 315/111.91 |
| 4,384,968 A * | 5/1983 | Polizzotti et al. | | 252/60 |
| 4,462,675 A * | 7/1984 | Moraw et al. | | 399/250 |
| 4,475,688 A * | 10/1984 | Hodges | | 239/102.2 |
| 4,538,899 A * | 9/1985 | Landa et al. | | 399/156 |
| 4,555,232 A * | 11/1985 | Raccah et al. | | 432/222 |
| 4,635,382 A * | 1/1987 | Bourdeau | | 34/97 |
| 4,662,902 A * | 5/1987 | Meyer-Pittroff | | 96/53 |
| 4,687,649 A * | 8/1987 | Kuroda et al. | | 423/243.03 |
| 4,850,537 A * | 7/1989 | Gourdine | | 239/400 |
| 4,852,454 A * | 8/1989 | Batchelder | | 89/1.11 |
| 4,853,621 A * | 8/1989 | Matsumoto | | 324/126 |
| 4,882,107 A * | 11/1989 | Cavender et al. | | 264/51 |
| 4,885,139 A * | 12/1989 | Sparks et al. | | 422/169 |
| 4,910,457 A * | 3/1990 | Matsumoto | | 324/772 |
| 4,939,500 A * | 7/1990 | Matsumoto | | 338/80 |
| 4,948,362 A * | 8/1990 | Baird | | 432/14 |
| 4,956,162 A * | 9/1990 | Smith et al. | | 423/244.07 |
| 4,984,623 A * | 1/1991 | Matsumoto | | 165/104.33 |
| 5,009,367 A * | 4/1991 | Nielsen | | 239/3 |
| 5,013,601 A * | 5/1991 | Bothe et al. | | 428/323 |
| 5,056,593 A * | 10/1991 | Hull | | 165/111 |
| 5,057,342 A * | 10/1991 | Hoy et al. | | 427/422 |
| 5,066,522 A * | 11/1991 | Cole et al. | | 427/422 |
| 5,067,404 A * | 11/1991 | Frunder et al. | | 101/488 |
| 5,083,613 A * | 1/1992 | Gregoli et al. | | 166/275 |
| 5,106,650 A * | 4/1992 | Hoy et al. | | 427/483 |
| 5,110,443 A * | 5/1992 | Gregoli et al. | | 208/46 |
| 5,141,156 A * | 8/1992 | Hoy et al. | | 239/135 |
| 5,161,739 A * | 11/1992 | Saito et al. | | 237/9 R |
| 5,171,613 A * | 12/1992 | Bok et al. | | 427/422 |
| 5,188,290 A * | 2/1993 | Gebauer et al. | | 239/3 |
| 5,192,517 A * | 3/1993 | Spink | | 423/243.08 |
| 5,198,206 A * | 3/1993 | Schoubye | | 423/522 |
| 5,211,342 A * | 5/1993 | Hoy et al. | | 239/707 |
| 5,212,229 A * | 5/1993 | Taylor et al. | | 524/556 |
| 5,240,689 A * | 8/1993 | Jones | | 423/235 |
| 5,283,001 A * | 2/1994 | Gregoli et al. | | 516/67 |
| 5,284,637 A * | 2/1994 | Merritt et al. | | 423/244.07 |
| 5,288,303 A * | 2/1994 | Woracek et al. | | 95/2 |
| 5,353,879 A * | 10/1994 | Watanabe et al. | | 169/52 |
| 5,367,869 A * | 11/1994 | DeFreitas | | 60/776 |
| 5,374,305 A * | 12/1994 | Glancy et al. | | 106/287.23 |
| 5,385,796 A * | 1/1995 | Spiewak et al. | | 430/64 |
| 5,391,220 A * | 2/1995 | Patterson | | 95/69 |
| 5,456,596 A * | 10/1995 | Gourdine | | 431/9 |
| 5,466,490 A * | 11/1995 | Glancy et al. | | 427/422 |
| 5,509,959 A * | 4/1996 | Nielsen et al. | | 106/287.35 |
| 5,565,180 A * | 10/1996 | Spink | | 423/220 |
| 5,603,769 A * | 2/1997 | Okubo et al. | | 118/621 |
| 5,669,221 A * | 9/1997 | LeBleu et al. | | 62/92 |
| 5,737,674 A * | 4/1998 | Venkatesan et al. | | 399/250 |
| 5,761,824 A | 6/1998 | Moon et al. | | |
| 5,922,103 A * | 7/1999 | Schwab et al. | | 95/8 |
| 5,955,037 A * | 9/1999 | Holst et al. | | 422/171 |
| 5,993,738 A * | 11/1999 | Goswani | | 422/22 |
| 6,003,305 A * | 12/1999 | Martin et al. | | 60/274 |
| 6,038,865 A * | 3/2000 | Watanabe et al. | | 62/3.6 |
| 6,045,934 A * | 4/2000 | Enami | | 429/439 |
| 6,054,154 A * | 4/2000 | Wang | | 426/92 |
| 6,057,069 A * | 5/2000 | Snelling et al. | | 430/45.3 |
| 6,063,452 A * | 5/2000 | Mild et al. | | 427/482 |
| 6,064,137 A * | 5/2000 | Cox | | 310/306 |
| 6,068,799 A * | 5/2000 | Rousseau et al. | | 264/6 |
| 6,089,023 A * | 7/2000 | Anderson et al. | | 60/653 |
| 6,089,237 A | 7/2000 | Podolak, Jr. et al. | | |
| 6,100,003 A * | 8/2000 | Snelling et al. | | 430/137.22 |
| 6,110,256 A * | 8/2000 | Reynolds et al. | | 95/4 |
| 6,168,709 B1 * | 1/2001 | Etter | | 208/131 |
| 6,180,226 B1 * | 1/2001 | McArdle et al. | | 428/332 |
| 6,189,484 B1 * | 2/2001 | Yin et al. | | 118/723 I |
| 6,197,394 B1 * | 3/2001 | Mild et al. | | 428/36.9 |
| 6,214,094 B1 * | 4/2001 | Rousseau et al. | | 96/15 |
| 6,235,088 B1 * | 5/2001 | Matsuura | | 96/53 |
| 6,238,466 B1 * | 5/2001 | Rousseau et al. | | 96/15 |
| 6,261,342 B1 * | 7/2001 | Rousseau et al. | | 95/59 |
| 6,322,756 B1 * | 11/2001 | Arno et al. | | 422/171 |
| 6,333,010 B1 * | 12/2001 | Holst et al. | | 422/171 |
| 6,349,668 B1 * | 2/2002 | Sun et al. | | 118/723 R |
| 6,350,609 B1 * | 2/2002 | Morozov et al. | | 506/16 |
| 6,375,909 B1 * | 4/2002 | Dangtran et al. | | 423/235 |
| 6,391,259 B1 * | 5/2002 | Malkin et al. | | 422/28 |
| 6,395,955 B1 * | 5/2002 | Roe et al. | | 604/361 |
| 6,398,125 B1 * | 6/2002 | Liu et al. | | 239/13 |
| 6,402,876 B1 * | 6/2002 | McArdle et al. | | 156/247 |
| 6,440,594 B1 * | 8/2002 | Kindler et al. | | 429/494 |
| 6,444,009 B1 * | 9/2002 | Liu et al. | | 75/332 |
| 6,451,364 B1 * | 9/2002 | Ito | | 426/244 |
| 6,460,787 B1 * | 10/2002 | Hartle et al. | | 239/691 |
| 6,484,502 B1 * | 11/2002 | Kikuchi | | 60/648 |
| 6,488,740 B1 * | 12/2002 | Patel et al. | | 95/71 |
| 6,491,737 B2 * | 12/2002 | Orme-Marmerelis et al. | | 75/335 |
| 6,537,692 B1 * | 3/2003 | Horiguchi et al. | | 429/413 |
| 6,544,599 B1 * | 4/2003 | Brown et al. | | 427/475 |
| 6,554,410 B2 * | 4/2003 | Jeanmaire et al. | | 347/77 |
| 6,562,099 B2 * | 5/2003 | Orme-Marmerelis et al. | | 75/335 |
| 6,579,574 B2 * | 6/2003 | Seaver et al. | | 427/466 |
| 6,627,563 B1 * | 9/2003 | Huberty | | 442/91 |
| 6,656,253 B2 * | 12/2003 | Willey et al. | | 96/27 |
| 6,682,584 B2 * | 1/2004 | Pozarnsky et al. | | 75/332 |
| 6,692,694 B1 * | 2/2004 | Curry et al. | | 422/28 |
| 6,699,302 B1 * | 3/2004 | Jones et al. | | 75/10.32 |
| 6,725,562 B2 * | 4/2004 | Nakagawa et al. | | 34/96 |
| 6,735,883 B1 * | 5/2004 | Bria et al. | | 34/444 |
| 6,750,448 B2 * | 6/2004 | Turecek et al. | | 250/281 |
| 6,763,606 B2 * | 7/2004 | Saida | | 34/97 |
| 6,764,659 B2 * | 7/2004 | Perlov et al. | | 422/186.07 |
| 6,773,555 B1 * | 8/2004 | Izutsu et al. | | 204/157.3 |
| 6,787,313 B2 * | 9/2004 | Morozov et al. | | 435/6 |
| 6,790,455 B2 * | 9/2004 | Chu et al. | | 424/423 |
| 6,797,447 B2 * | 9/2004 | Konya et al. | | 430/108.6 |
| 6,849,334 B2 * | 2/2005 | Horne et al. | | 428/402 |
| 6,852,948 B1 * | 2/2005 | Harrison | | 219/121.85 |

| Patent No. | Date | Inventor | Class |
|---|---|---|---|
| 6,855,302 B2* | 2/2005 | Eckert et al. | 423/210 |
| 6,858,064 B2* | 2/2005 | Bologa et al. | 95/65 |
| 6,877,681 B2* | 4/2005 | Hartle et al. | 239/691 |
| 6,906,322 B2* | 6/2005 | Berggren et al. | 250/288 |
| 6,923,794 B2* | 8/2005 | Ohmura | 604/291 |
| 6,969,540 B2* | 11/2005 | Seaver et al. | 427/482 |
| 6,977,025 B2* | 12/2005 | McArdle et al. | 156/272.2 |
| 7,007,872 B2* | 3/2006 | Yadav et al. | 241/1 |
| 7,025,812 B2* | 4/2006 | Marusic | 96/240 |
| 7,029,624 B2* | 4/2006 | Orme-Marmerelis et al. | 266/202 |
| 7,029,785 B2* | 4/2006 | Hatoh et al. | 429/480 |
| 7,052,600 B2* | 5/2006 | McKay | 210/167.3 |
| 7,064,472 B2* | 6/2006 | Pelrine et al. | 310/324 |
| 7,098,163 B2* | 8/2006 | Hampden-Smith et al. | 502/101 |
| 7,101,465 B2* | 9/2006 | Kobata et al. | 204/198 |
| 7,112,449 B1* | 9/2006 | Bi et al. | 436/180 |
| 7,117,827 B1* | 10/2006 | Hinderks | 123/43 R |
| 7,141,812 B2* | 11/2006 | Appleby et al. | 250/505.1 |
| 7,146,749 B2* | 12/2006 | Barron et al. | 34/596 |
| 7,178,747 B2* | 2/2007 | Yadav et al. | 241/23 |
| 7,214,349 B2* | 5/2007 | Holst et al. | 422/169 |
| 7,247,338 B2* | 7/2007 | Pui et al. | 427/2.24 |
| 7,255,954 B2* | 8/2007 | Hampden-Smith et al. | 429/483 |
| 7,306,845 B2* | 12/2007 | Horne et al. | 428/402 |
| 7,323,190 B2* | 1/2008 | Chu et al. | 424/426 |
| 7,347,889 B2* | 3/2008 | Matsuura et al. | 96/389 |
| 7,350,317 B2* | 4/2008 | Matsui et al. | 34/96 |
| 7,357,334 B2* | 4/2008 | Matsuura et al. | 239/34 |
| 7,361,400 B2* | 4/2008 | Shimamura et al. | 428/323 |
| 7,362,032 B2* | 4/2008 | Pelrine et al. | 310/309 |
| 7,374,733 B2* | 5/2008 | Taylor et al. | 423/210 |
| 7,384,680 B2* | 6/2008 | Bi et al. | 428/143 |
| 7,393,557 B2* | 7/2008 | Fleming et al. | 427/162 |
| 7,394,182 B2* | 7/2008 | Pelrine et al. | 310/324 |
| 7,410,606 B2* | 8/2008 | Appleby et al. | 264/219 |
| 7,411,204 B2* | 8/2008 | Appleby et al. | 250/505.1 |
| 7,415,781 B2* | 8/2008 | Barron et al. | 34/595 |
| 7,429,365 B2* | 9/2008 | Taylor | 423/210 |
| 7,438,027 B1* | 10/2008 | Hinderks | 123/43 R |
| 7,455,802 B2* | 11/2008 | Yu et al. | 264/285 |
| 7,462,469 B2* | 12/2008 | Bass et al. | 435/91.2 |
| 7,462,852 B2* | 12/2008 | Appleby et al. | 250/505.1 |
| 7,491,431 B2* | 2/2009 | Chiruvolu et al. | 427/582 |
| 7,494,532 B2* | 2/2009 | Azukizawa et al. | 96/27 |
| 7,498,286 B2* | 3/2009 | Manthiram et al. | 502/101 |
| 7,518,136 B2* | 4/2009 | Appleby et al. | 250/505.1 |
| 7,521,097 B2* | 4/2009 | Horne et al. | 427/585 |
| 7,523,603 B2* | 4/2009 | Hagen et al. | 60/39.55 |
| 7,544,630 B2* | 6/2009 | Hatoh et al. | 502/101 |
| 7,552,587 B2* | 6/2009 | Galligan | 60/324 |
| 7,553,463 B2* | 6/2009 | Zauderer | 423/210 |
| 7,569,181 B2* | 8/2009 | Golden | 422/22 |
| 7,570,478 B2* | 8/2009 | Terada et al. | 361/502 |
| 7,601,317 B2* | 10/2009 | Orita et al. | 423/243.01 |
| 7,604,332 B2* | 10/2009 | Nagashima | 347/84 |
| 7,618,684 B2* | 11/2009 | Nesbitt | 427/470 |
| 7,632,378 B2* | 12/2009 | Sakurai et al. | 156/345.31 |
| 7,642,213 B2* | 1/2010 | Hampden-Smith et al. | 502/101 |
| 7,644,511 B2* | 1/2010 | Ishikawa et al. | 34/78 |
| 7,676,954 B2* | 3/2010 | Classen et al. | 34/486 |
| 7,695,700 B2* | 4/2010 | Holst et al. | 423/210 |
| 7,704,483 B2* | 4/2010 | Shen et al. | 423/608 |
| 7,713,899 B2* | 5/2010 | Hampden-Smith et al. | 502/101 |
| 7,716,849 B1* | 5/2010 | Hicks | 34/104 |
| 7,754,169 B2* | 7/2010 | Constantz et al. | 423/165 |
| 7,758,327 B2* | 7/2010 | Leonard | 425/93 |
| 7,767,370 B2* | 8/2010 | Ishigami et al. | 430/45.51 |
| 7,776,383 B2* | 8/2010 | Yadav et al. | 427/8 |
| 7,776,405 B2* | 8/2010 | Bailey et al. | 427/483 |
| 7,776,406 B2* | 8/2010 | Horne et al. | 427/509 |
| 7,776,491 B2* | 8/2010 | Takada et al. | 429/517 |
| 7,785,098 B1* | 8/2010 | Appleby et al. | 425/470 |
| 7,793,869 B2* | 9/2010 | Mather et al. | 239/690 |
| 7,816,006 B2* | 10/2010 | Yadav et al. | 428/402 |
| 7,837,134 B2* | 11/2010 | Akisada et al. | 239/690 |
| 7,838,082 B2* | 11/2010 | Nesbitt | 427/470 |
| 7,842,264 B2* | 11/2010 | Cooper et al. | 423/210 |
| 7,858,283 B2* | 12/2010 | Ishigami et al. | 430/110.3 |
| 7,858,336 B1* | 12/2010 | Garner et al. | 435/41 |
| 7,866,220 B2* | 1/2011 | Oki et al. | 73/863.21 |
| 7,874,503 B2* | 1/2011 | Imahori et al. | 239/695 |
| 7,887,694 B2* | 2/2011 | Constantz et al. | 205/480 |
| 7,888,062 B1* | 2/2011 | Garner et al. | 435/41 |
| 7,892,599 B2* | 2/2011 | Yadav et al. | 427/212 |
| 7,893,413 B1* | 2/2011 | Appleby et al. | 250/505.1 |
| 7,906,262 B2* | 3/2011 | Ishigami et al. | 430/108.1 |
| 2002/0014460 A1* | 2/2002 | McKay | 210/696 |
| 2002/0172829 A1* | 11/2002 | Mori et al. | 428/407 |
| 2003/0033726 A1* | 2/2003 | Saida | 34/96 |
| 2003/0055469 A1* | 3/2003 | Ohmura | 607/96 |
| 2003/0068414 A1* | 4/2003 | Ito | 426/237 |
| 2003/0105381 A1* | 6/2003 | Eckert et al. | 588/207 |
| 2003/0132103 A1* | 7/2003 | Kobata et al. | 204/242 |
| 2003/0136668 A1* | 7/2003 | Kobata et al. | 204/242 |
| 2003/0143454 A1* | 7/2003 | Hatoh et al. | 429/44 |
| 2004/0051211 A1* | 3/2004 | Mastro et al. | 264/438 |
| 2004/0093049 A1* | 5/2004 | Ito | 607/100 |
| 2004/0096354 A1* | 5/2004 | Nomura et al. | 422/23 |
| 2004/0139853 A1* | 7/2004 | Bologa et al. | 95/64 |
| 2004/0142221 A1* | 7/2004 | Kawamura et al. | 429/24 |
| 2004/0214920 A1* | 10/2004 | Aoshima | 523/160 |
| 2005/0139239 A1* | 6/2005 | Prae | 134/34 |
| 2005/0269254 A1* | 12/2005 | Roitman | 210/252 |
| 2005/0284300 A1* | 12/2005 | Marusic | 96/271 |
| 2005/0288177 A1* | 12/2005 | Hatoh et al. | 502/101 |
| 2006/0045985 A1* | 3/2006 | Kozak | 427/458 |
| 2006/0064892 A1* | 3/2006 | Matsui et al. | 34/96 |
| 2006/0099457 A1* | 5/2006 | Moriya et al. | 428/701 |
| 2006/0204806 A1* | 9/2006 | Takada et al. | 429/26 |
| 2006/0204808 A1* | 9/2006 | Takada et al. | 429/26 |
| 2006/0264321 A1* | 11/2006 | Fernandez et al. | 502/182 |
| 2006/0264322 A1* | 11/2006 | Manthiram et al. | 502/182 |
| 2007/0091544 A1* | 4/2007 | Terada et al. | 361/502 |
| 2007/0166208 A1* | 7/2007 | Tanaka et al. | 422/186.04 |
| 2007/0254200 A1* | 11/2007 | Takada et al. | 429/38 |
| 2008/0003150 A1* | 1/2008 | Raoux et al. | 422/105 |
| 2008/0003151 A1* | 1/2008 | Raoux et al. | 422/173 |
| 2008/0003157 A1* | 1/2008 | Raoux et al. | 423/239.1 |
| 2008/0003158 A1* | 1/2008 | Raoux et al. | 423/239.1 |
| 2008/0014134 A1* | 1/2008 | Raoux et al. | 423/241 |
| 2008/0156731 A1* | 7/2008 | Gordon | 210/652 |
| 2008/0160351 A1* | 7/2008 | Felix et al. | 429/12 |
| 2008/0161429 A1* | 7/2008 | Felix | 521/28 |
| 2008/0199378 A1* | 8/2008 | Orita et al. | 423/243.01 |
| 2008/0229606 A1* | 9/2008 | Hirai et al. | 34/97 |
| 2008/0236208 A1* | 10/2008 | Miyata et al. | 68/5 C |
| 2008/0242218 A1* | 10/2008 | Asano et al. | 454/338 |
| 2008/0292450 A1* | 11/2008 | Yano et al. | 415/116 |
| 2009/0001200 A1* | 1/2009 | Imahori et al. | 239/700 |
| 2009/0078800 A1* | 3/2009 | Nakasone et al. | 239/690 |
| 2009/0134248 A1* | 5/2009 | Yamaguchi | 239/690 |
| 2009/0197089 A1* | 8/2009 | Klippert | 428/413 |
| 2009/0233222 A1* | 9/2009 | Mori et al. | 430/270.1 |
| 2009/0234600 A1* | 9/2009 | Matsumoto | 702/64 |
| 2009/0258148 A1* | 10/2009 | Moriya et al. | 427/343 |
| 2009/0272827 A1* | 11/2009 | Akisada et al. | 239/690 |
| 2009/0289132 A1* | 11/2009 | Watanabe et al. | 239/690 |
| 2009/0321544 A1* | 12/2009 | Akisada et al. | 239/704 |
| 2010/0000224 A1* | 1/2010 | Cappello | 60/780 |
| 2010/0000240 A1* | 1/2010 | Nakada et al. | 62/91 |
| 2010/0024462 A1* | 2/2010 | Kamisako et al. | 62/331 |
| 2010/0025505 A1* | 2/2010 | Suda et al. | 239/690 |
| 2010/0044475 A1* | 2/2010 | Nakada et al. | 239/690 |
| 2010/0044476 A1* | 2/2010 | Yano et al. | 239/699 |
| 2010/0065260 A1* | 3/2010 | Jickling et al. | 134/32 |
| 2010/0068395 A1* | 3/2010 | Moriya et al. | 427/343 |
| 2010/0071402 A1* | 3/2010 | Mihara et al. | 62/408 |
| 2010/0072310 A1* | 3/2010 | Yano et al. | 239/704 |
| 2010/0077770 A1* | 4/2010 | Kamisako et al. | 62/3.6 |
| 2010/0077791 A1* | 4/2010 | Kamisako et al. | 62/373 |
| 2010/0116068 A1* | 5/2010 | Oki et al. | 73/863.21 |
| 2010/0133366 A1* | 6/2010 | Yano et al. | 239/690 |
| 2010/0133367 A1* | 6/2010 | Yano et al. | 239/700 |
| 2010/0147003 A1* | 6/2010 | Ueda et al. | 62/314 |
| 2010/0187338 A1* | 7/2010 | Yano et al. | 239/690 |
| 2010/0206959 A1* | 8/2010 | Oki et al. | 239/3 |
| 2010/0223944 A1* | 9/2010 | Tsujimoto et al. | 62/264 |

| | | | | | | |
|---|---|---|---|---|---|---|
| 2010/0236269 A1* | 9/2010 | Mamemoto et al. ............. 62/331 | JP | 57139231 A | * | 8/1982 |
| 2010/0243765 A1* | 9/2010 | Uegaki et al. ................. 239/690 | JP | 58073415 A | * | 5/1983 |
| 2010/0243767 A1* | 9/2010 | Mori et al. .................... 239/691 | JP | 58221340 A | * | 12/1983 |
| 2010/0243768 A1* | 9/2010 | Yano et al. .................... 239/704 | JP | 60-191822 | | 12/1985 |
| | | | JP | 61-29292 | | 2/1986 |
| | FOREIGN PATENT DOCUMENTS | | JP | 61025811 A | * | 2/1986 |
| | | | JP | 5-345156 | | 12/1993 |
| EP | 1810592 A1 * | 7/2007 | JP | 2002-191426 | | 7/2002 |
| EP | 1909043 A2 * | 4/2008 | JP | 2005-131549 | | 5/2005 |
| EP | 1944092 A1 * | 7/2008 | JP | 2007020883 A | * | 2/2007 |
| JP | 50-112145 | 9/1975 | JP | 2007021375 A | * | 2/2007 |
| JP | 54042867 A * | 4/1979 | JP | 2007203189 A | * | 8/2007 |
| JP | 54105838 A * | 8/1979 | JP | 2010091191 A | * | 4/2010 |
| JP | 54111160 A * | 8/1979 | JP | 2010091262 A | * | 4/2010 |
| JP | 54111161 A * | 8/1979 | JP | 2010091263 A | * | 4/2010 |
| JP | 55121330 A * | 9/1980 | WO | WO 9638692 A1 | * | 12/1996 |
| JP | 55153666 A * | 11/1980 | WO | WO 2007013099 A1 | * | 2/2007 |
| JP | 56038431 A * | 4/1981 | WO | WO 2007052583 A1 | * | 5/2007 |
| JP | 56038432 A * | 4/1981 | WO | WO 2010091531 A1 | * | 8/2010 |
| JP | 56064239 A * | 6/1981 | | | | |
| JP | 56149528 A * | 11/1981 | * cited by examiner | | | |

HEATING BLOWER WITH ELECTROSTATIC ATOMIZING DEVICE

TECHNICAL FIELD

The present invention relates to a heating blower with an electrostatic atomizing device which generates nanometer-size mist.

BACKGROUND ART

Generally, a heating blower, such as a hair drier and a fan heater, comprises a housing, an air passage provided in the housing, a fan disposed in the air passage, and a heater disposed in the air passage. Japanese Non-examined Patent Publication No. 2002-191426 discloses a hair drier which added a negative ion generator for generating negative ions to such a heating blower. The hair drier can give moisture to hair by spraying nanometer-size mist which adhered to negative ions onto the hair. However, because the mist which adhered to the negative ion is about 1 nm in diameter and is evaporable by heat of a heater, there was a problem that it was difficult to give sufficient mist to hair. Furthermore, because the mist is lightweight, there was also a problem that a discharging direction thereof was changeable by ambient electrostatic charge and wind. Furthermore, because such mist is small in volume, it could not retain such sufficient water as to increase fiber bonding inside hair, though it could give moisture to the hair temporary. Still furthermore, because the mist is neutral (that is, pH 7.0), it could not neutralize alkaline hair which was damaged by hair dyeing and perm and bring the hair to a weak acid (about ph 5.5) which is a condition of healthy hair.

Meanwhile, Japanese Patent No. 3260150 discloses an electrostatic atomizing device which can generate nanometer-size mist which is about 3 to 100 nm in diameter and does not evaporate easily. It is possible to use the electrostatic atomizing device as a substitute for the above negative ion generator, but, because it is necessary for the electrostatic atomizing device to intermittently replenish water for atomization in the device, it is troublesome to replenish the water. Furthermore, because the electrostatic atomizing device needs a tank for storing water, the device may grow in size.

DISCLOSURE OF THE INVENTION

In view of the above problem, the object of the present invention is to provide a heating blower with an electrostatic atomizing device which can generate nanometer-size mist without replenishment of water.

The heating blower in accordance with the present invention comprises a housing, a fan, a heater, and an electrostatic atomizing device. The housing has an air passage inside it. The fan is disposed in the air passage to aspirate external air from an air inlet formed at an upstream portion of the air passage and discharge the aspirated air to the outside from an air outlet formed at a downstream portion of the air passage. The heater is disposed in the air passage to heat the air to be discharged from the air outlet. The electrostatic atomizing device is provided in the housing and discharges atomized water to the outside. The feature of the present invention resides in that the electrostatic atomizing device comprises a discharging electrode, an opposed electrode disposed opposite the discharging electrode, a cooling part which cools the discharging electrode to generate moisture from ambient air near the discharging electrode, and a high voltage applying part which applies a high voltage between the discharging electrode and the opposed electrode to atomize water generated near the discharging electrode.

In the heating blower of the present invention, because the electrostatic atomizing device has a cooling part and the cooling part generates moisture from ambient air (in other words, the cooling part condenses ambient air to water), it is possible for the heating blower to discharge atomized water without replenishment of water. Furthermore, because the heating blower does not need a tank and so on for storing water, it is possible to downsize the heating blower.

Furthermore, because the atomized water generated by the electrostatic atomizing device is nanometer-size mist which is about 3 to 100 nm in diameter, the atomized water is resistant to evaporation, and even if the mist is discharged with heated air, the mist does not evaporate easily and therefore it can give sufficient mist to a user. Furthermore, such mist is not easily influenced by ambient electrostatic charge and wind, and therefore a discharging direction of such mist becomes stable. Furthermore, because such mist is large in volume, the mist can retain such sufficient water as to increase fiber bonding inside hair, when the heating blower is applied to a hair drier for example. Still furthermore, because the mist is a weak acid (about ph 4-6), it can neutralize alkaline hair damaged by hair dyeing and perm and can bring the hair to a weak acid (about ph 5.5) which is a condition of healthy hair.

That is, the heating blower of the present invention does not need replenishment of water and can be downsized, and furthermore, it can sufficiently give a user various effects that the nanometer-size mist has, for example, in a case where the heating blower is applied to a hair drier, an effect of moisturizing hair, an effect of increasing intensity of the hair by raising the fiber bonding inside the hair and giving tightness and stiffness to the hair, an effect of bringing the hair close to a weak acid which is a condition of healthy hair and preventing evaporation of moisture inside the hair by tightening cuticle and increasing continuousness of moisturizing effect, an effect of preventing an escape of nutrients such as a protein and amino acid, and an effect of correcting cuticle and increasing gloss of hair.

Because the heating blower of the present invention does not require replenishment of water and can be downsized, it is possible to dramatically increase a commercial value of various heating blower, such as a handheld heating blower (for example, a hair drier), and a room heating blower (for example, a fan heater).

Preferably, the fan is disposed at the upstream portion of the air passage and the heater is disposed at the downstream portion of the air passage, and the housing has a cooling passage branched from the air passage between the fan and the heater, and the discharging electrode is disposed in the cooling passage. In this case, because the cooling passage is branched from the air passage above the heater, the air heated by the heater does not flow into the cooling passage, and therefore it becomes possible to efficiently cool the discharging electrode disposed in the cooling passage. In order to generate dew condensation water continuously, it is necessary to moderately change the air around the discharging electrode. That is, a situation where a large amount of air is blown to the discharging electrode, or a situation where the air around the discharging electrode is not changed is not good for generating dew condensation water. So, by branching the cooling passage from the air passage and disposing the discharging electrode in the cooling passage, it becomes possible to change the air around the discharging electrode moderately while preventing the discharging electrode from being blown by a large amount of air, and therefore it becomes possible to generate dew condensation water continuously.

Preferably, the housing has a mist outlet for discharging the atomized water to the outside, and the mist outlet is formed so that a discharging direction of the atomized water discharged from the mist outlet becomes parallel to a discharging direction of the air discharged from the air outlet. In this case, the atomized water discharged from the mist outlet is carried by air discharged from the air outlet, and it can arrive at a far point quickly.

Preferably, the electrostatic atomizing device has a radiator for dissipating heat absorbed when the cooling part cools the discharging electrode, and the fan is disposed at the upstream portion of the air passage, and the heater is disposed at the downstream portion of the air passage, and the radiator is disposed in the air passage between the fan and the heater. In this case, because large amount of air that has not been heated by the heater is blown to the radiator by the fan, the radiator can dissipate heat efficiently. Furthermore, because the radiator is disposed in the air passage, the heating blower is not upsized.

In the above case, it is preferable that the radiator has a function of rectifying air flowing through the air passage. Concretely speaking, it is preferable that a cross section of the radiator which faces a pathway of the air flowing through the air passage has a uniform shape along the pathway of the air. In this case, the radiator can stabilize the flow of the air discharged from the air outlet.

Alternatively, it is also preferable that the housing has a heat radiation passage branched from the air passage between the fan and the heater, and the radiator is disposed in the heat radiation passage. In this case, too, the air before being heated by the heater is blown to the radiator, so the radiator can dissipate heat efficiently.

BEST MODE FOR CARRYING OUT THE INVENTION

Hereinafter, the present invention will be described in more detail with reference to the accompanying drawings.

First Embodiment

Figure 1:
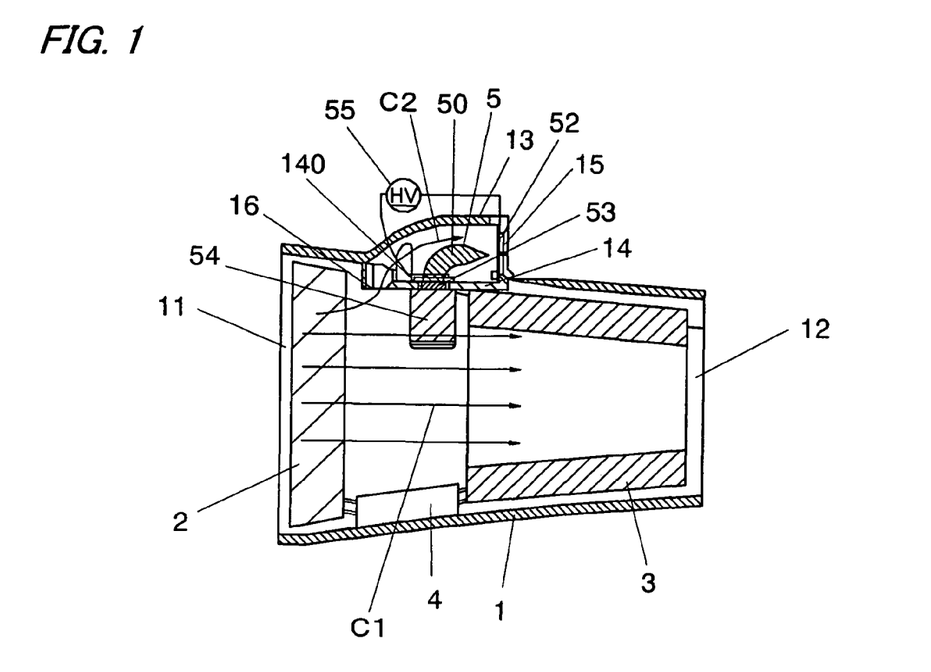
FIG. 1 is a side sectional view of a substantial part of a heating blower in accordance with a first embodiment of the present invention.

In this embodiment, as one example of a heating blower with an electrostatic atomizing device, a hair drier with an electrostatic atomizing device will be explained. FIG. 1 shows a substantial part of the hair drier of this embodiment. A housing 1 of the hair drier has an air passage C1 inside it. An air inlet 11 is formed at one end of the air passage C1, and an air outlet 12 is formed at the other end of the air passage C1. A fan 2 is disposed at an upstream portion of the air passage C1, that is, on the air inlet 11 side of the air passage C1, and it aspirates external air from the air inlet 11 and discharges the aspirated air from the air outlet 12 to the outside. A heater 3 is disposed at a downstream portion of the air passage C1, that is, on the air outlet side of the air passage C1, and it heats the air to be discharged from the air outlet 12. Furthermore, a power source 4 for supplying power to the fan 2 and the heater 3 is disposed inside the air passage C1.

Figure 2A:
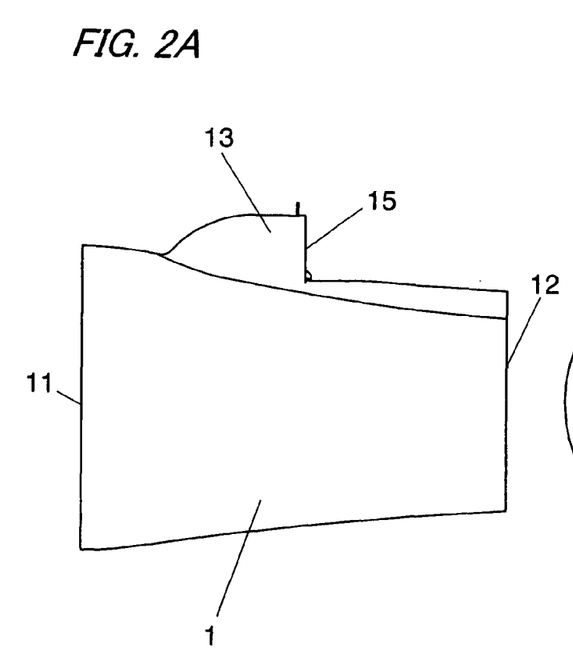
FIG. 2A is a side view of the substantial part of the heating blower of FIG. 1.
Figure 2B:
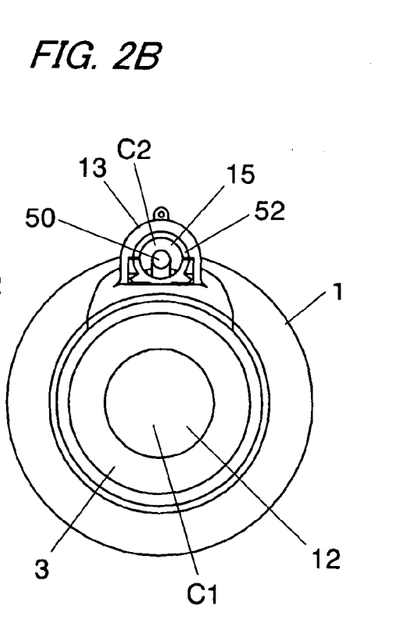
FIG. 2B is a front view of the substantial part of the heating blower of FIG. 1.

The housing 1 has a cooling passage C2 branched from the air passage C1 between the fan 2 and the heater 3. As shown in FIGS. 2A and 2B, the cooling passage C2 comprises a half-cylindrical mist cover 13 and a flat plate 14 for separating the cooling passage C2 from the air passage C1, and one end of the cooling passage C2 is communicated with the air passage C1 through a branch hole 16 (see, FIG. 1), and the other end of it is communicated with the outside through a mist outlet 15 formed at an end of the mist cover 13. By this constitution, part of the air aspirated by the fan 2 enters the cooling passage C2 from the branch hole 16, and it flows out from the mist outlet 15.

Figure 3:
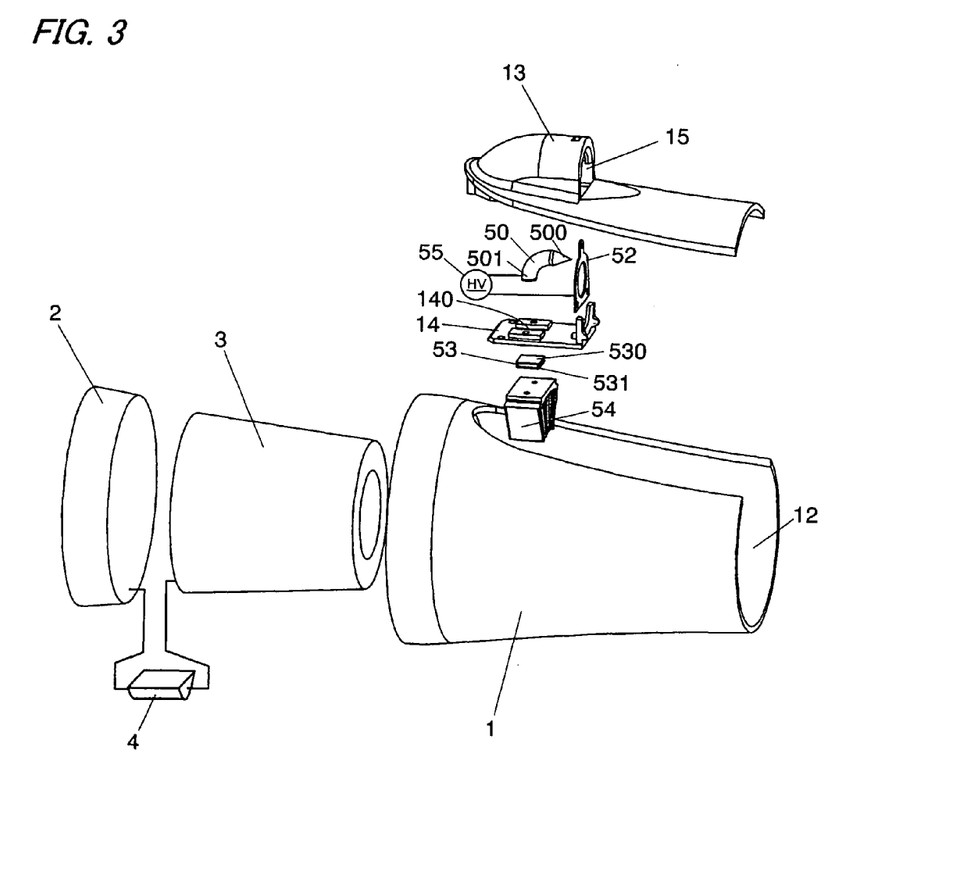
FIG. 3 is an exploded perspective view of the substantial part of the heating blower of FIG. 1.
Figure 4:
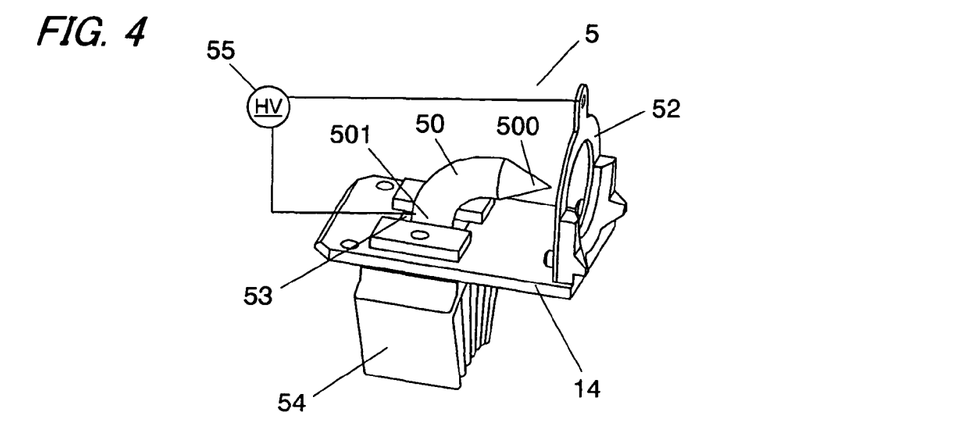
FIG. 4 is a perspective view of an electrostatic atomizing device of the heating blower of FIG. 1.

As shown in FIGS. 3 and 4, the flat plate 14 is equipped with an electrostatic atomizing device 5 for discharging atomized water to the outside from the mist outlet 15. The electrostatic atomizing device 5 has a discharging electrode 50 made of non-porous material and having a high thermal conductivity, an opposed electrode 52 disposed opposite a tip 500 of the discharging electrode 50, a cooling part 53 which cools the discharging electrode 50 to generate moisture from ambient air near the discharging electrode, a radiator fin 54 (a radiator) for dissipating heat which was absorbed when the cooling part 53 cooled the discharging electrode 50, and a high voltage applying part 55 which applies a high voltage between the discharging electrode 50 and the opposed electrode 52 to atomize water generated near the discharging electrode.

The discharging electrode 50 is disposed in the cooling passage C2. The discharging electrode 50 is formed into a L-shaped configuration which was formed by bending a cylinder about 90 degrees so that an axial direction of an lower end 501 of the discharging electrode 50 is approximately perpendicular to a blowing direction of the air passage C1 and an axial direction of the tip 500 of the discharging electrode 50 is approximately parallel to the blowing direction of the air passage C1. The tip 500 of the discharging electrode 50 is a sharp conical configuration. The opposed electrode 52 is a ring-like shape, and is accurately positioned on the flat plate 14 so that it will face the tip 500 of the discharging electrode 50, and is fixed thereto.

The cooling part 53 comprises a Peltier unit having a cooling face 530 and a radiation face 531, and is secured in a hole 140 formed in the flat plate 14 in a condition where the cooling face 530 faces the cooling passage C2. The lower end 501 of the discharging electrode 50 is closely connected to the cooling face 530, and an upper surface of the radiator fin 54 is closely connected to the radiation face 531. When the Peltier unit is energized by a power supply (not shown), heat moves from the cooling face 530 to the radiation face 531, and the discharging electrode 50 connected to the cooling face 530 is cooled. And then, when a temperature of the ambient air around the discharging electrode 50 drops below a dew point, water vapor in the air condenses, and water is generated on the surface of the discharging electrode 50.

The heat that was absorbed when the cooling part 53 cooled the discharging electrode 50 is dissipated from the radiator fin 54. The radiator fin 54 is disposed in the air passage C1 and is located downstream from the branch hole 16 between the fan 2 and the heater 3.

The high voltage applying part 55 is for applying a predetermined high voltage between the discharging electrode 50 and the opposed electrode 52. When it gives a negative voltage to the discharging electrode 50, a high voltage electric field is generated between the tip 500 of the discharging electrode 50 and an inner edge of the opposed electrode 52. Then, the water held by the tip of the discharging electrode 50 bursts to the air with negative electric charge, and it repeats Rayleigh fission while it drifts in the high voltage electric field, and eventually, large amount of nanometer-size ion mist (hereinafter, called nano-ion mist) is generated.

In the hair drier of this embodiment constituted as above, when a switch (not shown) is turned on, the fan 2 begins to rotate and aspirates exterior air from the air inlet 11. The aspirated air flows through the air passage C1, and is heated by the heater 3, and is discharged from the air outlet 12 to the outside as hot air. Some air aspirated into the air passage C1 is branched to the cooling passage C2 at the branch hole 16, and it flows through the cooling passage C2, and it flows out from the mist outlet 15 to the outside. The cooling part 53 (the Peltier unit) is energized by a power supply (not shown), and it begins to cool the discharging electrode 50. When temperature of the ambient air around the discharging electrode 50 drops below a dew point, dew condensation water is generated on the surface of the discharging electrode 50. The high voltage applying part 55 applies a predetermined high voltage between the discharging electrode 50 and the opposed electrode 52, whereby the dew condensation water at the tip of the discharging electrode 50 repeats Rayleigh fission, and eventually, large amount of nano-ion mist is generated. The generated nano-ion mist is discharged from the mist outlet 15 to the outside with the air flowing through the cooling passage C2, and is sprayed on user's hair, together with the hot air discharged from the air outlet 12.

As mentioned above, in the hair drier of this embodiment, because the cooling part 53 generates moisture from ambient air near the discharging electrode by cooling the discharging electrode 50, it is possible to discharge nano-ion mist without replenishment of water. And, because the nano-ion mist generated by the electrostatic atomizing device 5 is about 3 to 100 nm in diameter, the nano-mist ion does not easily evaporate even if it is discharged with hot air, and it is not easily influenced by ambient electrostatic charge and wind, and a discharging direction of it is stable. Furthermore, because such mist is large in volume, the mist can retain such sufficient quantity of water as to increase fiber bonding inside hair. Furthermore, because the mist is a weak acid (about ph 4-6), it can neutralize alkaline hair damaged by hair dyeing and perm and can bring the hair to a weak acid (about ph 5.5) which is a condition of healthy hair. Therefore, in the hair drier of this embodiment, the nano-ion mist does not evaporate easily and can reach user's hair surely even when it was discharged with hot air, and it can produce various effects that the nano-ion mist has, for example, an effect of moisturizing hair, an effect of bringing hair close to a weak acid which is a condition of healthy hair and preventing evaporation of moisture inside the hair by tightening cuticle and increasing continuousness of moisturizing effect, an effect of preventing an escape of nutrients such as a protein and amino acid, an effect of correcting cuticle and increasing gloss of hair, and an effect of increasing intensity of hair by raising the fiber bonding inside the hair and giving tightness and stiffness to the hair. Still Furthermore, because the hair drier does not need a tank for storing water and a member for transporting water from the tank to the discharging electrode, it is possible to downsize the hair drier. As mentioned above, because the hair drier of this embodiment does not require replenishment of water and can be downsized, it is possible to dramatically increase a commercial value of the hair drier.

Furthermore, in the electrostatic atomizing device 5 of this embodiment, because water is directly generated on the discharging electrode 50, a time period from a beginning of the cooling of the cooling part 53 to a generation of the nanometer-size ion is short. Therefore, the electrostatic atomizing device 5 of this embodiment can be applied to a product which is used only for a short time, such as a hair drier, without problems. Furthermore, because water that is generated by condensation does not include an impurity, there is no fear that $CaCO_3$, $MgO$, and so on are deposited.

In this embodiment, because the cooling passage C2 is branched upstream from the radiator fin 54 between the fan 2 and the heater 3, the air heated by the heater 3 and the radiator fin 54 does not enter the cooling passage C2, whereby the cooling part 53 can cool the discharging electrode 50 disposed in the cooling passage C2 quickly and can generate dew condensation water.

In order to generate dew condensation water continuously, it is necessary to moderately change the air around the discharging electrode 50. That is, a situation where a large amount of air is blown to the discharging electrode 50, or a situation where the air around the discharging electrode 50 is not changed is not good for generating dew condensation water. So, in this embodiment, by disposing the discharging electrode 50 in the cooling passage C2 and forcedly sending some external air which includes water vapor and was taken in by the fan 2 to the cooling passage C2 through the branch hole 16, it becomes possible to change the air around the discharging electrode 50 moderately while preventing the discharging electrode from being blown by a large amount of air, and therefore it becomes possible to generate dew condensation water continuously. The position of the branch hole 16 and a configuration of the cooling passage and so on may be modified in order to adjust the amount of air to be sent to the cooling passage.

Also, in order to generate dew condensation water efficiently, it is necessary for the radiator fin 54 to radiate heat efficiently. In this embodiment, because the radiator fin 54 is disposed in the air passage C1 between the fin 54 and the heater 3, large amount of air that has not been heated by the heater is blown to the radiator by the fan 2, and therefore the radiator fin 54 can dissipate heat efficiently. In addition, the radiator fin 54 of this embodiment has a function of rectifying air flowing through the air passage C1 and making stable air flow which heads toward one direction. That is, the radiator fin 54 is formed so that a cross section of the radiator fin which faces a pathway of the air flowing through the air passage C1 has a uniform shape along the pathway of the air. By this, even when the radiator fin 54 is disposed in the air passage C1, the flow of the air to be discharged from the air outlet 12 is not disturbed, and the air of a stable flow is discharged from the air outlet 12.

In this embodiment, the mist outlet 15 is formed so that a discharging direction of the nano-ion mist to be discharged from the mist outlet 15 becomes parallel to a discharging direction of the air to be discharged from the air outlet 12. In other words, the mist outlet 15 is formed so that the blowing direction toward the opposed electrode 52 from the discharging electrode 50 in the cooling passage C2 becomes parallel to the blowing direction in the air passage C1. By this constitution, the nano-ion mist discharged from the mist outlet can be carried by the air discharged from the air outlet 12, and it can arrive at user's hair quickly.

For reference, if the cooling of the discharging electrode by the cooling part 53 is too strong, the water vapor in the air may freeze on the discharging electrode 50. In such a case, the energization of the Peltier unit may be weaken or stopped temporarily to raise the temperature of the discharging electrode 50. Or, in order to heat the discharging electrode 50 and melt the frozen water, the heat absorption side of the Peltier unit may be interchanged with the heat radiation side thereof by reversing the polarity of the energization.

Figure 5A:
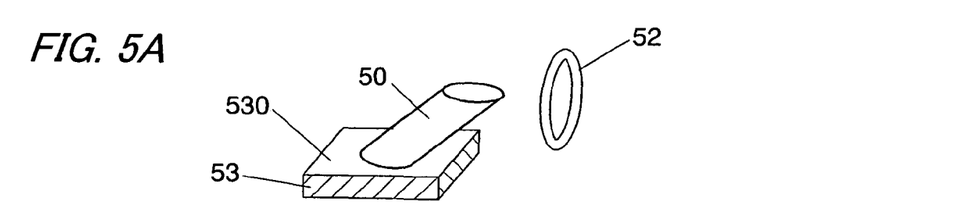
FIG. 5A is a view showing another form of the electrostatic atomizing device of the heating blower of FIG. 1.

The shape of the discharging electrode 50 is not limited to the shape shown above, and it may have a configuration shown in FIGS. 5A to 5D, for example. The discharging electrode 50 shown in FIG. 5A is formed by cutting both ends of a cylindrical metal bar, which was made of non-porous material and has a high thermal conductivity, obliquely with respect to an axial direction and parallel to each other. One cut surface is fixed on the cooling face 530 of the Peltier unit by means of soldering and so on, and the other cut surface is disposed so that a sharp part will face the opposed electrode 52. In this case, the manufacturing process may be simplified, and the costs can be reduced.

Figure 5B:
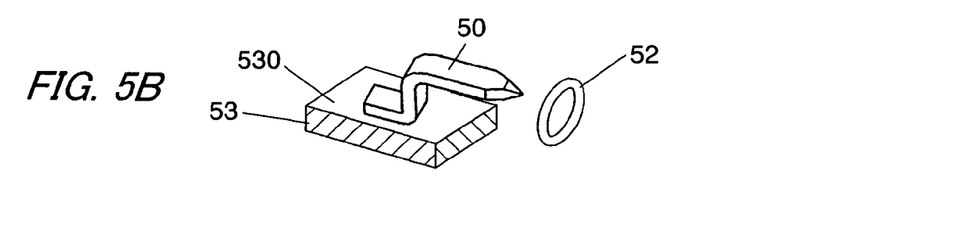
FIG. 5B is a view showing another form of the electrostatic atomizing device of the heating blower of FIG. 1.

The discharging electrode 50 shown in FIG. 5B is formed from an elongated metal plate which has a high thermal conductivity and is made of non-porous material. One end of the metal plate is sharpened, and the metal plate is formed into a crank shape by bending two points of the metal plate 90 degrees each, and a flat face on the other end side is fixed on the cooling face 530 of the Peltier unit by means of soldering and so on so that the one end will face the opposed electrode 52. In this case, the discharging electrode 50 can be stably fixed on the cooling face 530.

Figure 5C:
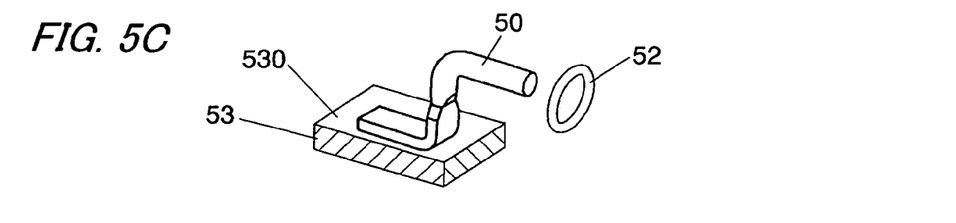
FIG. 5C is a view showing another form of the electrostatic atomizing device of the heating blower of FIG. 1.

The discharging electrode 50 shown in FIG. 5C is formed into a crank shape by processing an axial half part of a cylindrical metal bar which was made of non-porous material and has a high thermal conductivity into a flat plate by press working and bending two points thereof 90 degrees. A flat part thereof is fixed on the cooling face 530 of the Peltier unit by means of soldering and so on so that cylindrical one end will face the opposed electrode 52. In this case, too, the discharging electrode 50 can be stably fixed on the cooling face 530. For reference, although the tip of the discharging electrode shown in FIG. 5C is not sharpened, it can generate the electrostatic atomizing phenomenon from the edge of the front face.

Figure 5D:
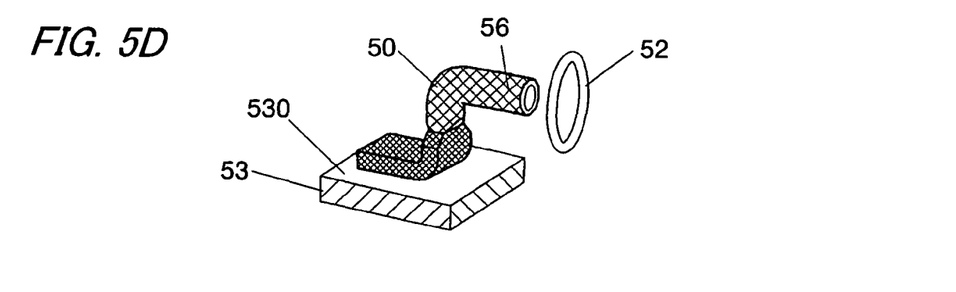
FIG. 5D is a view showing another form of the electrostatic atomizing device of the heating blower of FIG. 1.

The discharging electrode 50 shown in FIG. 5D is a discharging electrode in which an outer surface of the cylindrical part of the discharging electrode shown in FIG. 5C is covered by porous metal 56. The porous metal 56 constitutes a water-retaining part for temporally storing a surplus of water generated in the discharging electrode 50. In this case, even if condensation does not occur temporally, it is possible to generate nano-ion mist continuously by using the water of the water-retaining part.

Second Embodiment

Figure 6:
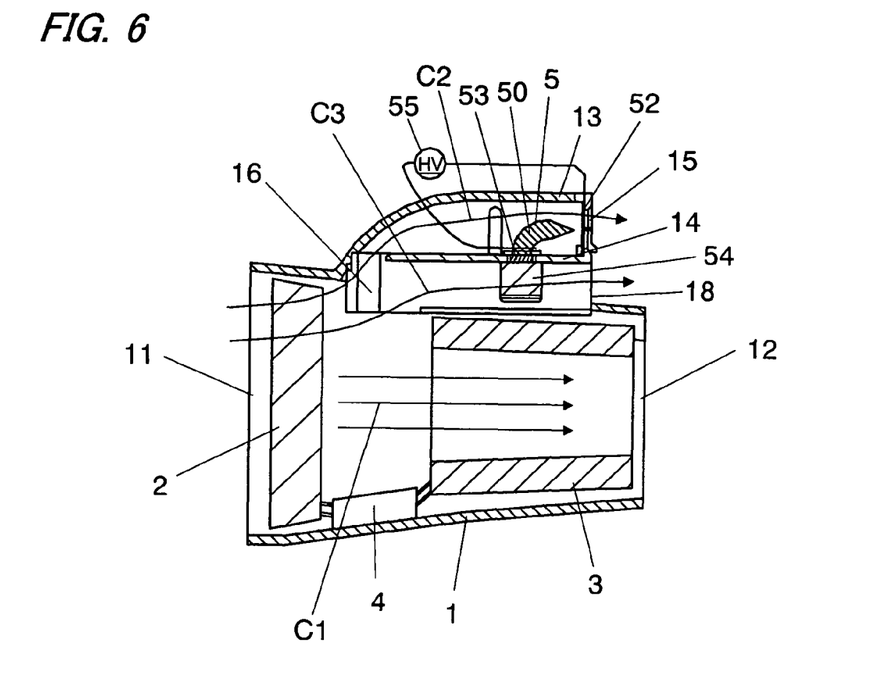
FIG. 6 is a side sectional view of a substantial part of a heating blower in accordance with a second embodiment of the present invention.
Figure 7A:
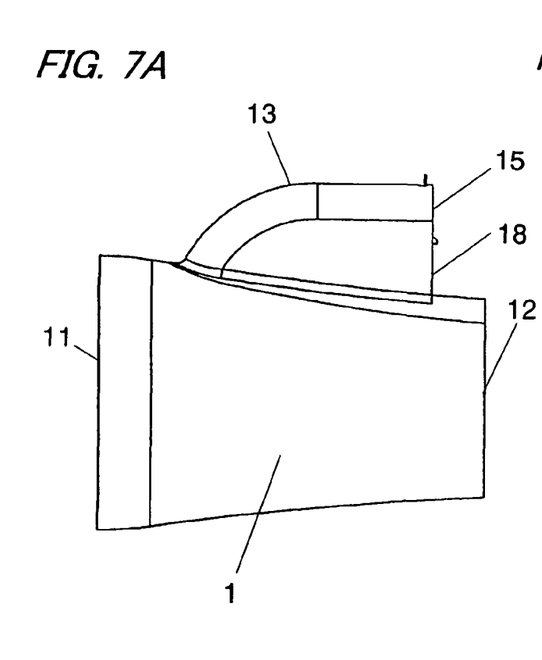
FIG. 7A is a side view of the substantial part of the heating blower of FIG. 6.
Figure 7B:
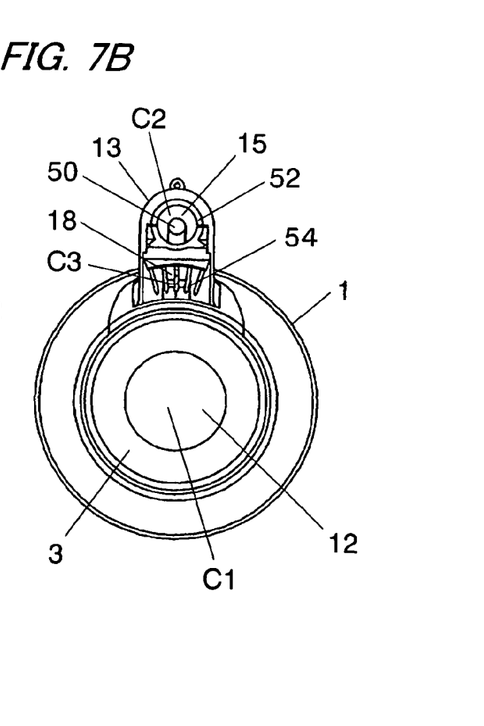
FIG. 7B is a front view of the substantial part of the heating blower of FIG. 6.

FIGS. 6, 7A, and 7B show a hair drier with an electrostatic atomizing device in accordance with a second embodiment of the present invention. The basic composition of this embodiment is identical to the first embodiment, so similar parts to the first embodiment are identified by the same reference character and no duplicate explanation is made here.

The housing 1 of this embodiment has a heat radiation passage C3 which is branched from the air passage C1 between the fan 2 and the heater 3, in addition to the cooling passage C2. The cooling passage C2 and the heat radiation passage C3 are covered by the half-cylindrical mist cover 13, and they are separated from each other by the flat plate 14 in the mist cover 13, and an upper portion of the flat plate 14 defines the cooling passage C2 and an lower portion of the flat plate defines the heat radiation passage C3. One end of the cooling passage C2 is communicated with the air passage C1 through the branch hole 16, and the other end of it is communicated with the outside through a mist outlet 15. One end of the heat radiation passage C3 is communicated with the air passage C1 through the branch hole 16, and the other end of it is communicated with the outside through a radiation hole 18 formed at an end of the mist cover 13. The electrostatic atomizing device 5 is provided on the flat plate 14, as is the case with the first embodiment, and the discharging electrode 50 is disposed in the cooling passage C2 and the radiator fin 54 is disposed in the heat radiation passage C3.

In the hair drier of this embodiment constituted as above, when a switch (not shown) is turned on, the fan 2 begins to rotate and aspirates exterior air from the air inlet 11. The aspirated air flows through the air passage C1, and is heated by the heater 3, and is discharged from the air outlet 12 to the outside as hot air. Some air aspirated into the air passage C1 is branched to the cooling passage C2 at the branch hole 16, and is discharged from the mist outlet 15 to the outside together with the nano-ion mist generated by the electrostatic atomizing device 5. And, some air aspirated into the air passage C1 enters the heat radiation passage C3 from the branch hole 16, and it cools the radiator fin 54, and is discharged to the outside from the radiation hole 18.

Because the cooling passage C2 and the heat radiation passage C3 each are branched from the air passage C1 between the fan 2 and the heater 3, the air heated by the heater 3 does not enter the cooling passage C2 and the heat radiation passage C3. Therefore, it is possible to cool the discharging electrode 50 quickly and to dissipate heat efficiently by the radiation fin 54. As a result, it is possible to generate large amount of nano-ion mist efficiently.

Although, in the first and second embodiments, a hair drier is shown as one example of the heating blower, the present invention can be applied to not only a hair drier but also other heating blower such as a fan heater.

As mentioned above, as many apparently widely different embodiments of this invention may be made without departing from the spirit and scope thereof, it is to be understood that the invention is not limited to the specific embodiments thereof except as defined in the appended claims.

The invention claimed is:

1. A heating blower with an electrostatic atomizing device comprising:
    a housing with an air passage therein;
    a fan disposed in said air passage to aspirate external air from an air inlet formed at an upstream portion of said air passage and discharge aspirated air to outside from an air outlet formed at a downstream portion of said air passage;
    a heater disposed in said air passage to heat air to be discharged from said air outlet; and
    an electrostatic atomizing device provided in said housing to discharge atomized water to outside, wherein said electrostatic atomizing device comprises:
- a discharging electrode,
- an opposed electrode disposed opposite said discharging electrode,
- a cooling part which cools said discharging electrode to generate moisture from ambient air near said discharging electrode, and
- a high voltage applying part which applies a high voltage between said discharging electrode and said opposed electrode to atomize water generated near said discharging electrode.

2. The heating blower as set forth in claim 1, wherein
said fan is disposed at the upstream portion of said air passage and said heater is disposed at the downstream portion of said air passage,
said housing having a cooling passage branched from said air passage between said fan and said heater,
said discharging electrode being disposed in said cooling passage.

3. The heating blower as set forth in claim 1, wherein
said housing has a mist outlet for discharging the atomized water to outside,
said mist outlet being formed so that a discharging direction of the atomized water discharged from said mist outlet becomes parallel to a discharging direction of air discharged from said air outlet.

4. The heating blower as set forth in claim 1, wherein
said electrostatic atomizing device has a radiator for dissipating heat absorbed when said cooling part cools said discharging electrode,
said fan being disposed at the upstream portion of said air passage and said heater being disposed at the downstream portion of said air passage,
said radiator being disposed in said air passage between said fan and said heater.

5. The heating blower as set forth in claim 4, wherein
said radiator has a function of rectifying air flowing through said air passage.

6. The heating blower as set forth in claim 5, wherein
a cross section of said radiator which faces a pathway of the air flowing through said air passage has a uniform shape along the pathway of the air.

7. The heating blower as set forth in claim 1, wherein
said electrostatic atomizing device has a radiator for dissipating heat absorbed when said cooling part cools said discharging electrode,
said fan being disposed at the upstream portion of said air passage and said heater being disposed at the downstream portion of said air passage,
said housing having a heat radiation passage branched from said air passage between said fan and said heater,
said radiator being disposed in said heat radiation passage.

* * * * *